United States Patent
Frymire et al.

(10) Patent No.: US 12,341,894 B1
(45) Date of Patent: Jun. 24, 2025

(54) TECHNOLOGIES FOR AUTHENTICATIONS VIA WEB COMPONENTS

(71) Applicant: Knabble, Inc., New York, NY (US)

(72) Inventors: Eleanor Frymire, San Francisco, CA (US); Gillian Leung, Rye, NY (US)

(73) Assignee: Knabble, Inc., New York, NY (US)

( * ) Notice: Subject to any disclaimer, the term of this patent is extended or adjusted under 35 U.S.C. 154(b) by 0 days.

(21) Appl. No.: 18/940,631

(22) Filed: Nov. 7, 2024

Related U.S. Application Data

(60) Provisional application No. 63/602,299, filed on Nov. 22, 2023.

(51) Int. Cl.
*H04L 9/32* (2006.01)

(52) U.S. Cl.
CPC .................. *H04L 9/3213* (2013.01)

(58) Field of Classification Search
CPC ...................................................... H04L 9/3213
See application file for complete search history.

(56) References Cited

U.S. PATENT DOCUMENTS

| | | | | |
|---|---|---|---|---|
| 2013/0282516 A1* | 10/2013 | McCartney | ............ | G06Q 50/01 705/26.7 |
| 2022/0116376 A1* | 4/2022 | Stayskal | ............. | H04L 65/4015 |
| 2023/0004660 A1* | 1/2023 | Kim | ....................... | H04L 9/3213 |
| 2023/0412382 A1* | 12/2023 | Palanisamy | ............ | H04L 63/104 |

OTHER PUBLICATIONS developer.factset.com [online], "Advanced data connection," available on or before Nov. 7, 2024, via Internet Archive: Wayback Machine URL <https://web.archive.org/web/20241107211246/https://developer.factset.com/widgets/FactSet-Widgets-Catalogue/docs/advanced-data-connection>, retrieved on Nov. 7, 2024, retrieved from URL <https://developer.factset.com/widgets/FactSet-Widgets-Catalogue/docs/advanced-data-connection>, 5 pages.
developer.mozilla.org [online], "Web Components," Oct. 6, 2024, retrieved on Nov. 7, 2024, retrieved from URL <https://developer.mozilla.org/en-US/docs/Web/API/Web_components>, 6 pages.

\* cited by examiner

*Primary Examiner* — Henry Tsang
(74) *Attorney, Agent, or Firm* — Fish & Richardson P.C.

(57) ABSTRACT

Methods, and systems for authentication via web components. One of the methods includes: submitting a token request, by a browser application, to a first server entity for a token from an API hosted by a second server entity; receiving, at the browser application, the token and a time to live (TTL) for the token from the first server entity, the first server entity having added an API key to the token request to produce an appended token request and forwarded the appended token request to the API at the second server entity, the API at the second server entity having authenticated the API key and returned the token and the TTL to the first server entity, and the first server entity having returned the token and the TTL to the browser application; and sending, by the browser application to the second server entity, a data request with the token.

19 Claims, 9 Drawing Sheets

```
/* React + Typescript Customer Example */ const getToken: () => Promis<{
    token: string
    ttl: number;
}> = useCa;;back(async () => {
    const { data } = await genToken(); // graphQL method to sent a request for a token
    return data.genVizComponentsDemoToken; // return the token and ttl in an object
}, [genToken]);

useEffect(() => {
    const atamGetDataFns = {
        atomAuthCallback: getToken, // the callback to return the token
    };
    window['atomCustomFunction'] = atomGetDataFns; // append the object to the
};n{getToken]);
```

FIG. 9

TECHNOLOGIES FOR AUTHENTICATIONS VIA WEB COMPONENTS

CROSS-REFERENCE TO RELATED APPLICATION

This application claims the benefit under 35 U.S.C. § 119 (e) of the filing date of U.S. Patent Application No. 63/602,299, entitled "Technologies for Authentications via Web Components" which was filed on Nov. 22, 2023, and which is incorporated here by reference in its entirety.

BACKGROUND

Technical Field

This specification relates to web components.

Background

A web component of a web page enables a web developer to create a reusable and custom hypertext markup language (HTML) element with a functionality encapsulated away from other source code of the web page. Conventionally, the web component may be used as a user interface (UI) element that does not require a datum or an attribute that change a content thereof.

In order to eliminate an output of a request for a data fetch from the web page rendered on a client (e.g., a web browser application), the web developer may desire to include such request within the web component. However, doing so is technologically problematic when authenticating against an application programming interface (API) requiring a login, because the login cannot be included in such request, due to a potential exposure of the login to an unauthorized actor, who may access the login to impersonate the client.

SUMMARY

This specification describes technologies for authenticating data requests. These technologies generally involve authenticating against an API hosted by a data storing entity where secure data is stored via a token. The data storing entity generates the token and grants access to the token to trusted customers, e.g., a financial custodian (a first server entity) that uses the data storing entity (a second server entity), via an API key. Users of the trusted customer can obtain access to the token when the trusted customer adds the API key to a token request and forwards the token request and API key to the entity where the data is stored. Upon receiving the token request with the API key, the entity authenticates the request and sends a token to the trusted customer, which can then forward it to the user's computer. This allows the user's computer to access secure data without having to separately authenticate against the API, while still preserving the security of the data.

In general, one innovative aspect of the subject matter described in this specification can be embodied in methods that include the actions of placing a call for a web page from the browser application to a first server entity; receiving, at the browser application, a set of data from the first server entity responsive to the call; generating, at the browser application, a session of the web page based on the set of data; submitting a token request, by the browser application, to the first server entity for a token from an application programming interface (API) hosted by a second server entity; receiving, at the browser application, the token and a time to live for the token from the first server entity, the first server entity having added an API key to the token request to produce an appended token request and forwarded the appended token request to the API at the second server entity, the API at the second server entity having authenticated the API key and returned the token and a time to live for the token to the first server entity, and the first server entity having returned the token and the time to live for the token to the browser application; prior to expiration of the time to live for the token, sending, by the browser application to the second server entity, a data request with the token; receiving, at the browser application from the second server entity, requested data in response to the data request; and rendering, at the browser application, the requested data.

In some implementations, the session of the web page includes a window object and an authorization component.

In some implementations, the authorization component is a custom hypertext markup language (HTML) element.

In some implementations, the method comprises initiating, by the window object, a storage of the token unique to the session such that components of the web page can access the token during the session.

In some implementations, the method comprises emitting, by the authorization component, a custom event that communicates to components of the web page that the token has been received and set in a storage of the session.

In some implementations, the second server entity represents a different entity than the first server entity represents.

In some implementations, the method comprises submitting a second token request, by the browser application, to the first server entity for a second token from the API upon expiration of the time to live for the token.

In some implementations, the token is limited in scope.

In some implementations in which the session of the web page includes a window object and an authorization component, the window object is built and maintained by an entity represented by the first server entity and the authorization component is built and maintained by a second entity represented by the second server entity.

In some implementations, the time to live for the token is a duration of time for which the token is accessible to components of the web page for use in authenticating data requests.

Another innovative aspect of the subject matter described in this specification can be embodied in methods that include the actions of receiving, by a first server entity, a call for a web page from a browser application; submitting, by the first server entity to the browser application, a set of data responsive to the call; receiving, by the first server entity from the browser application, a token request for a token from an application programming interface (API) hosted by a second server entity, the browser application having generated a session of the web page based on the set of data; adding, by the first server entity, an API key to the token request to produce an appended token request; forwarding, by the first server entity, the appended token request to the API at the second server entity; receiving, at the first server entity from the second server entity, a token and a time to live for the token, the API at the second server entity having authenticated the API key and returned the token and the time to live for the token to the first server entity; and returning, by the first server entity, the token and a time to live for the token to the browser application.

In some implementations, the session of the web page includes a window object and an authorization component.

In some implementations, the second server entity represents a different entity than the first server entity represents.

In some implementations, the token is limited in scope.

In some implementations, the time to live for the token is a duration of time for which the token is accessible to components of the web page for use in authenticating data requests.

Another innovative aspect of the subject matter described in this specification can be embodied in methods that include the actions of receiving, by a second server entity from a first server entity, an appended token request, the first server entity having received a call for a web page from the browser application and returned a set of data to the browser application responsive to the call, the browser application having generated a session of the web page based on the set of data and submitted to the first server entity a token request for a token from an application programming interface (API) hosted by the second server entity, and the first server entity having added an API key to the token request to form the appended token request and forwarded the appended token request to the second server entity; authenticating, by the API at the second server entity, the API key; returning, by the API at the second server entity, the token and a time to live for the token to the first server entity, the first server entity having been configured to forward the token and the time to live for the token to the browser application; prior to expiration of the time to live for the token, receiving, by the second server entity from the browser application, a data request with the token; forwarding, to the browser application by the second server entity, requested data in response to the data request, upon which the browser application renders the requested data.

In some implementations, the second server entity represents a different entity than the first server entity represents.

In some implementations, the token is limited in scope.

In some implementations, the time to live for the token is a duration of time for which the token is accessible to components of the web page for use in authenticating data requests.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The subject matter described in this specification can be implemented in particular embodiments so as to realize one or more of the following advantages.

The technologies disclosed herein simplify the process of granting access to secure data to third parties while still allowing for preservation of the security of the data. Conventionally, each browser application requesting access to secure data might individually send a token request directly to the server entity storing the data. Additionally, different components on a single browser application that are performing different tasks might request tokens for each different task being performed. However, this could require the server entity storing the data to authenticate token requests from each individual browser application, and potentially from each of the different components on each individual browser application that sends token requests to the server entity by granting each browser application and component access to an API key.

Given the potentially broad range of browser applications that might request tokens from the data-storing server entity, this may not be feasible, or may require excessive time and/or computing power, for both the browser application or component requesting a token and the data-storing server entity. For example, the browser application or component would have to gain access to an API key prior to making the token request, resulting in an additional step for the browser application or component. The data-storing server entity would have to determine whether to grant access to API keys to each browser application or component making a token request. If the data-storing server entity desires to grant access to API keys only to trusted third parties, the data-storing server entity would have to verify that each browser application was a trusted third party before granting it access to an API key, which could be a lengthy and costly process.

Alternatively, a server entity storing secure data could make an API key publicly available so as to avoid repeatedly granting access to API keys to numerous browser applications. However, this could compromise the security of the data stored by the server entity by allowing any browser application, such as untrusted or unverified browser applications, to gain access to an API key and send token requests to the server entity.

The technologies disclosed herein eliminate the need for a server entity storing secure data to separately grant access to an API key to each browser application requesting a token and to each component of a browser application performing a different task. Instead, the data-storing server entity need only grant access to an API key to an intermediate server entity, which can be a trusted customer of the data-storing server entity or other trusted third party. The intermediate server entity then can add the API key to token requests that it receives from various browser applications and components of browser applications and thus authenticate the requests. The intermediate server entity can add the API key only to token requests that it receives from trusted sources, thereby preserving the security of the requested data. For example, the intermediate server entity can have its own secure process for determining whether a browser application or component from which it receives a request is eligible to have an API key added to its request.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 9 is example code that can be used to set a callback function that enables an authentication process.

Like reference numbers and designations in the various drawings indicate like elements.

DETAILED DESCRIPTION

Figure 1:
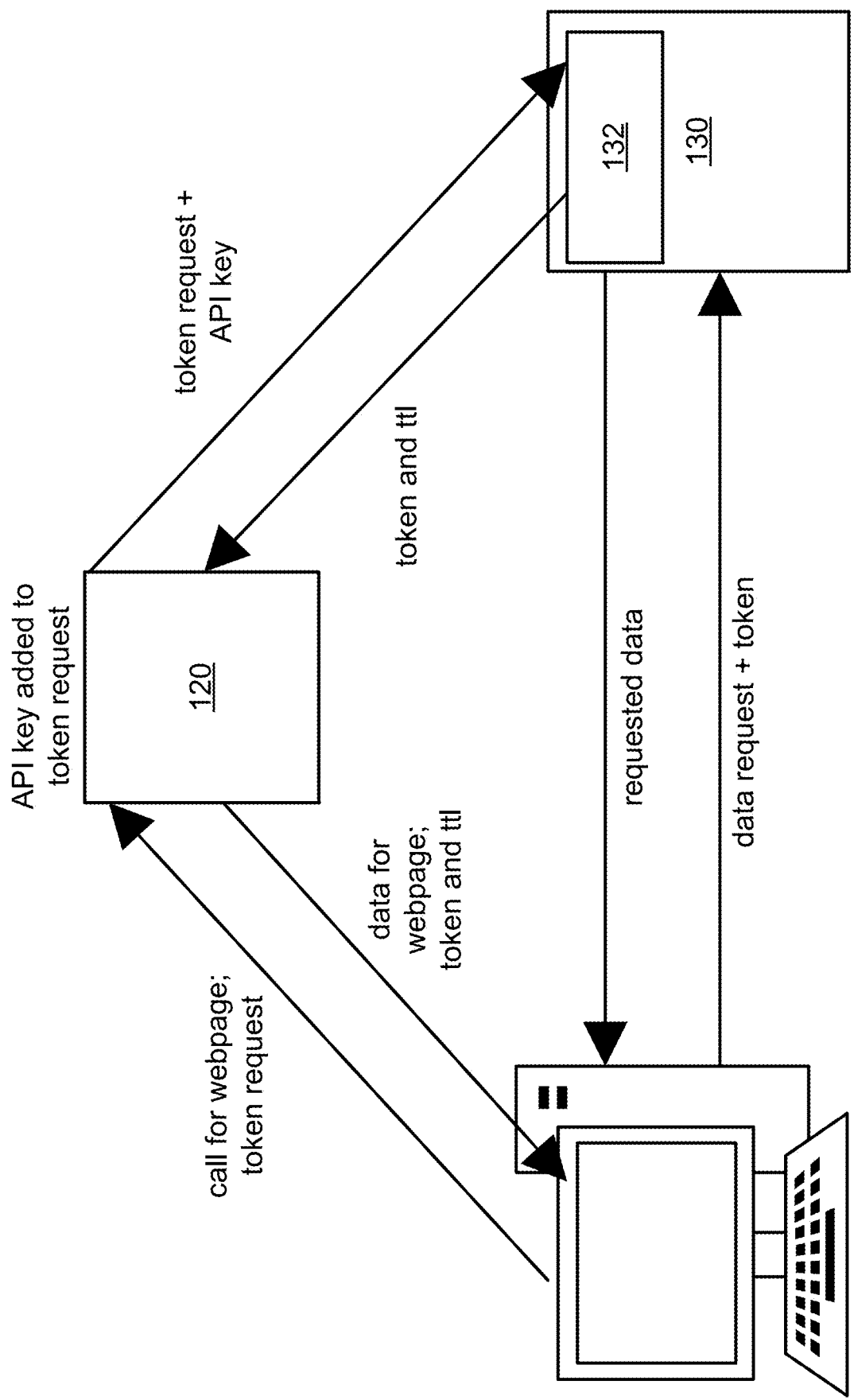
FIG. 1 is an example authentication system.

FIG. 1 is an example authentication system 100. Authentication system 100 includes a browser application 110, a first server entity 120 (e.g., one or more servers providing web page data from a financial management company), and a second server entity 130 (one or more servers of a third party that provides data relevant to the financial custodian web page).

The browser application 110 can be utilized by users to gain access to data stored at the second server entity 130. The browser application 110 can be accessed via a user device. In particular, users may utilize the browser application 110 to download one or more web pages from the first server entity 120 through which they can authenticate requests for data that is stored at the second server entity 130.

The first server entity 120 can be the server of an organization that provides access to proprietary information for its clients. For example, the first server entity 120 can be the server of an investment management company. The investment management company can track investments made by its clients, such as in mutual funds or other financial instruments, and provide its clients with access to information about the investments. As another example, the first server entity 120 can be the server of a medical institution from which patients of the medical institution can access their personal medical data.

The second server entity 130 can be the server of an organization that provides data to third parties. For example, the second server entity 130 can store financial data and provide this data to third parties upon request. As a more specific example, the second server entity 130 can store historical information about the prices of financial instruments, and/or the results of analyses performed regarding the prices of financial instruments. The second server entity 130 can provide the historical information and/or the results of the analyses to third parties who may be interested in such information.

For example, investors in a particular set of stocks or a mutual fund can request data about historical trends in the stocks or funds from the second server entity 130. In particular, such investors can use a browser application to log in to the server of an investment management company, which can be the first server entity 120. Investors can interface with the first server entity 120 via the browser application using the techniques described herein to obtain authentication for requests for data about a certain stock or fund from the second server entity 130.

As another example, the second server entity 130 can be the server of an organization that stores personal medical data. Patients of a given medical institution can request access to their personal medical data from the second server entity 130. Patients can use a browser application to log in to the server of a medical institution, which can be the first server entity 120. Patients can interface with the first server entity 120 via the browser application using the techniques described herein to obtain authentication for requests for their personal medical data from the second server entity 130.

In the example authentication system 100, the browser application 110 places a call for a web page to the first server entity 120. The first server entity 120 then returns a set of data that is responsive to the call to the browser application 110. The set of data returned by the first server entity 120 can include data required to generate the web page called for by the browser application 110. The data returned by the first server entity 120 can include HyperText Markup Language (HTML) elements and associated files.

Upon receiving the set of data required to generate the web page, the browser application 110 generates the web page based on the set of data. The browser application 110 then submits a token request to the first server entity 120. The first server entity then appends an API key to the token request and submits the token request and API Key to an application programming interface (API) 132 hosted by the second server entity 130.

A token can take various forms, such as a string of alphanumeric characters, a pin, a number, a sequence of characters, or any other suitable form. A token is a means for authenticating access by the browser application 110 to data from the second server entity 130. For example, a token accompanying a request for data from the second server entity 130 made by the browser application 110 indicates to the second server entity 130 that the request is authenticated, and therefore the second server entity 130 can securely transfer data to the browser application 110 in response to the request. Alternatively, a request for data from the second server entity 130 made by the browser application 110 that lacks a token would not be authenticated, preventing the second server entity 130 from responding to such a request.

A token can be limited in various ways. For example, a token can be temporally limited, meaning that it only has a certain "time to live". A time to live (ttl) is a time period during which the token is valid. Once the time to live for a token has expired, the token can no longer be used to authenticate a request for data. For example, a request for data from the second server entity 130 made by the browser application 110 that is accompanied by a token for which the time to live has expired would not be authenticated, and the second server entity 130 would be prevented from responding to such a request.

A token can also be limited in scope, meaning that the token can only authenticate certain requests or types of requests, but not others. A request for data from the second server entity 130 made by the browser application 110 that is accompanied by a token that is limited in scope such that the request does not fall within the scope of the token would not be authenticated, and the second server entity 130 would be prevented from responding to such a request.

As noted above, upon receiving a token request from the browser application 110, the first server entity adds an API key to the token request to produce an appended token request. An appended token request includes both a request for a token and an API key. An API key can take various form, such as a string of alphanumeric characters or any other suitable form. An API key is a means for authenticating a request for a token from the second server entity 130. The second server entity 130 can grant access to API keys only to certain specified third parties such that a request accompanied by an API key indicates to the second server entity 130 that the request comes from an authorized party to which the second server entity 130 specifically granted access. If the second server 130 grants access to API keys only to authorized parties, then a request accompanied by an API key indicates to the second server entity 130 that the request comes from an authorized party. Thus, by adding an API key to the token request received from the browser application 110, the first server entity 120 authenticates the token request such that the second server entity 130 can securely respond to the token request.

The arrangement in the authentication system 100 in which the first server entity 120 adds an API key to a token request that it receives from the browser application 110 is important to achieving the benefits of the technology disclosed herein. It is desirable for the second server entity to grant only token requests that are accompanied by an API key. This allows the second server entity to preserve the security of the data that it stores by ensuring that access to API keys are granted only to trusted third parties/authorized parties.

A browser application such as the browser application 110 might send a token request directly to the second server entity, without first sending it to the first server entity for authentication. Additionally, different components on a single browser application that are performing different tasks might request tokens for each different task being performed. However, this could require the second server entity to authenticate token requests from each individual browser application, and potentially different components on each individual browser application, that sends token requests to the second server entity by granting each browser application and component access to an API key. Given the potentially broad range of browser applications that might request tokens from the second server entity, this may not be feasible, or may require excessive time and/or computing power, for both the browser application or component requesting a token and the second server entity. For example, the browser application or component would have to gain access to an API key prior to making the token request, resulting in an additional step for the browser application or component. The second server entity would have to determine whether to grant access to API keys to each browser application or component making a token request. If the second server entity desires to grant access to API keys only to trusted third parties, the second server entity would have to verify that each browser application was a trusted third party before granting it access to an API key, which could be a lengthy and costly process. Alternatively, the second server entity could make an API key publicly available, but this would compromise the security of the data stored by the second server entity by allowing any browser application, such as untrusted or unverified browser applications, to gain access to an API key and send appended token requests to the second server entity.

The arrangement in the authentication system 100 eliminates the need for separately granting an API key by the second server entity to each browser application requesting a token and to each component of a browser application performing a different task. Instead, the second server entity need only grant access to an API key to a first server entity, such as the first server entity 120. The first server entity then can add the API key to token requests that it receives from various browser applications and components of browser applications, thereby authenticating the requests. This can still preserve the security of the data stored by the second server entity because the first server entity can have its own secure process for determining whether a browser application or component from which it receives a request is eligible to have an API key added to its request. For example, the first server entity can only add API keys to requests that come from trusted browser applications. Thus, the second server entity need not be involved in granting access to API keys, simplifying the process by which it provides access to the data it stores while still preserving the security of the data.

Upon adding an API key to the token request received from the browser application 110, the first server entity 120 forwards the appended token request to the API 132 at the second server entity 130. The API 132 can then authenticate the API key included in the appended token request. The authentication of the API key by the API 132 can involve determining whether the API key is an API key to which the second server entity previously granted access. The authentication of the API key by the API 132 can additionally or alternatively involve determining whether the API key satisfies a specified condition or possesses a specified format.

The API 132 can then respond to the appended token request by returning a token and a time to live for the token to the first server entity 120. As described above, a token can take various forms, such as a string of alphanumeric characters. The time to live for the token, indicating the time period during which the token is valid as described above, can take the form of a number indicating a number of units of time. For example, the time to live for the token can be a number that represents a number of seconds, minutes, hours, or days. The number of units of time indicated by the time to live for the token represents the duration of the period of time for which the token is valid.

Upon receiving the token and the time to live for the token, the first server entity 120 returns the token and the time to live for the token to the browser application 110.

Prior to the expiration of the time to live for the token, the browser application 110 can send a data request with the token to the second server entity 130. The data request can specify data that is stored at the second server entity 130 that a user of the browser application 110 desires to view. For example, if the second server entity 130 can store financial data, the data request can specify one or more financial instruments regarding which a user desires data, and the nature of the financial data desired. For example, the data request can include a request for historical information about the one or more financial instruments, or a request for the results of analyses involving the one or more financial instruments.

As another example, if the second server entity 130 can store personal medical data, the data request can specify a patient about which particular personal medical information is desired, and/or the nature of the particular personal medical information desired. For example, the data request can include a request for the results of a medical test of the patient, or a request for historical medical information about the patient.

The second server entity 130 receives the data request with the token from the browser application 110. The second server entity 130 can then determine whether the time to live for the token has expired. If the token is limited in scope, the second server entity 130 can additionally determine whether the data requested is within the scope of the token.

Upon determining both that the time to live for the token has not expired and, if applicable, that the data requested is within the scope of the token, the second server entity 130 can authenticate the data request. If the time to live for the token has expired, the second server entity 130 is prevented from authenticating the data request. If the token is limited in scope and the requested data does not fall within the scope of the token, the second server entity 130 is prevented from authenticating the data request.

If the second server entity 130 has authenticated the data request, the second server entity 130 can return the requested data to the browser application 110. Upon receiving the requested data from the second server entity 130, the browser application 110 can render the requested data. For example, the browser application 110 can render the requested data to be viewed by a user of the browser application 110. The browser application 110 can render the requested data in any suitable format for representing the requested data for viewing by a user. For example, the requested data can be rendered as text, as a graph, as an illustration, or as any combination of these or other suitable forms. The requested data can be rendered on an interface viewable by a user, such as a graphical user interface (GUI) of a device.

If the time to live for the token has expired, the second server entity 130 is prevented from authenticating the data request. In some implementations, upon receiving a notification that the data request was not authenticated because the time to live for the token had expired, the browser application 110 can submit another token request to the first server entity 120. In some implementations, the browser application 110 can iteratively submit token requests to the first server entity 120 upon expiration of each token received.

Figure 2:
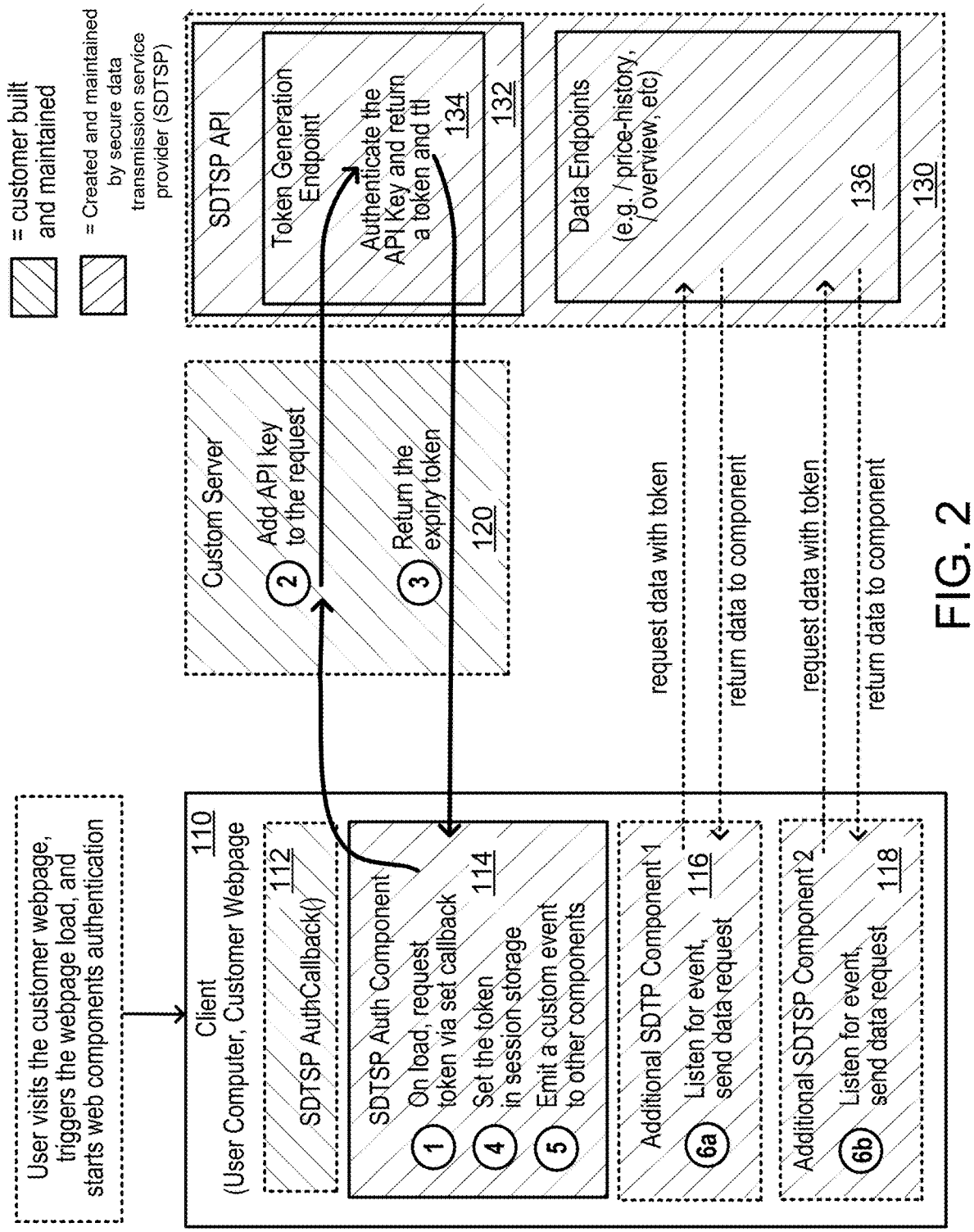
FIG. 2 is an alternative illustration of an example authentication system carrying out an authentication process.

FIG. 2 is an alternative illustration of the example authentication system 100 carrying out an authentication process as described above. In the illustration shown in FIG. 2, the elements of the system that are built and maintained by a customer are indicated with diagonal hatching from top right to bottom left. The customer can be the owner and/or manager of the first server entity 120. The customer can be an organization that provides access to proprietary information for its users. A user of the customer can be a user of the browser application 110. The user can use the browser application 110 to visit a webpage of the customer, trigger the webpage load, and start an authentication process for the web components of the webpage. The user can do this for the purpose of accessing proprietary information that is stored at the second server entity 130 by means of webpage built and maintained by the customer.

The elements of FIG. 2 that are created and maintained by a secure data transmission service provider (SDTSP) are indicated with diagonal hatching from top left to bottom right. The SDTSP can be the owner and/or manager of the second server entity 130. The SDTSP can be an organization that stores secure data and provides the secure data to third parties upon request. The customer can be a customer of the SDTSP that provides access for its clients to the secure data stored at the second server entity 130 by the SDTSP.

In particular, a client of the customer can use the browser application 110 to visit a webpage of the customer. This can trigger the webpage load and start an authentication process for components of the webpage. The authentication process can be a process through which components of the webpage are given access to secure data stored by the SDTSP at the second server entity 130. The authentication process is described in further detail below.

Once the authentication process has been completed for components of the webpage of the customer, the client of the customer visiting the webpage can use the components of the webpage to access data stored by the SDTSP at the second server entity 130.

For example, the customer can be an investment management company. The investment management company can track investments made by its clients, such as in mutual funds or other financial instruments, and provide its clients with access to information about the investments. This information can be derived from financial data stored by the SDTSP at the second server entity 130. The clients of the investment management company can access the information about their investments by using the browser application 110 to visit a webpage of the investment management company, triggering the webpage load, and starting an authentication process for the web components of the webpage. The successful completion of the authentication process can allow the client to access the information about their investments using the web components of the webpage.

As another example, the customer can be a medical institution from which patients of the medical institution can access their personal medical data. The medical institution can record personal medical data of its patients, such as health conditions, diagnoses, and test results. This personal medical data can be securely stored by the SDTSP at the second server entity 130. Patients of the medical institution can access their personal medical data by using the browser application 110 to visit a webpage of the medical institution and completing the authentication process for the components of the webpage. The successful completion of the authentication process can allow the patient to access their personal medical data using the web components of the webpage.

In the illustration shown in FIG. 2, the browser application 110 includes a window 112, a secure data transmission service provider (SDTSP) authorization component 114, a first additional SDTSP component 116 and a second additional SDTSP component 118.

The window 112 is a customer-built-and-maintained interface that is displayed on the browser application 110. An authentication command can include a string of text including the name of the SDTSP and a callback function, as illustrated in FIG. 2.

The SDTSP authorization component 114 is a component on the browser application 110. The SDTSP authorization component 114 can be activated based on a trigger. The trigger can be an event, such as the execution of a web page that requires third party content, the loading of a particular component on the web page, or an interaction of the user with one or more components of the web page (e.g., a click). Once activated, the SDTSP authorization component 114 executes code to submit a token request to the first server entity 120 (step 1 in the figure). As described above, the requested token is a means of authenticating access by the browser application 110 to data from the second server entity 130. In some implementations, the SDTSP authorization component 114 can be configured to iteratively submit token requests to the first server entity 120 upon expiration of the time to live for each token that is stored in a session of a web page initiated on the browser application 110.

In some implementations, the SDTSP authorization component 114 can additionally set the token in the storage of a session initiated on the browser application 110 (step 4 in the figure). The session can have been initiated on the browser application 110 prior to the SDTSP authorization component 114 sending a token request to the first server entity 120. The session can have been initiated by the browser application 110 placing a call for a web page to the first server entity 120 and in turn receiving a set of data from the first server entity 120 responsive to the call, as described above in reference to FIG. 1.

The token that the SDTSP authorization component sets in the storage of the session can be a token that the browser application 110 has received from the first server entity 120 in response to the token request previously sent within the session. The token can have been generated by the API 132 hosted by the second server entity 130, returned to the first server entity 120 by the API 132, and ultimately returned by the first server entity 120 to the browser application 110.

By setting the token in the session storage, the SDTSP authorization component 114 ensures that any additional component on the browser application 110 operating in the session can access the token. This is advantageous because it means that different components of the browser application 110 that perform different tasks during the session that require data from the second server entity 130 can access the data without requiring each component to separately send a token request to the first server entity 120. This feature both improves the operating speed of the browser application and simplifies the authentication process for different components of the browser application.

In some implementations, the SDTSP authorization component 114 can additionally emit a custom event to other components of the browser application 110 upon receiving the token and setting it in session storage (step 5 in the figure). The custom event can be a communication to other web components that the token has been received and set in session storage. The custom event can take various forms suitable for conveying such communication. For example, the custom event can be a hypertext markup language (HTML) element. The following is an example of code on the SDTSP authorization component 114 that can be executed to cause the emission of the custom event:

const tokenAvailable=new CustomEvent ("tokenAvailable");
document.dispatchEvent (tokenAvailable);

The first additional SDTSP component 116 and the second additional SDTSP component 118 are additional components of the browser application 110 that are created and maintained by the SDTSP. The first additional SDTSP component 116 and the second additional SDTSP component 118 can be custom HTML elements. In some implementations, the first additional SDTSP component 116 and the second additional SDTSP component 118 listen for the custom event emitted by the SDTSP authorization component 114 upon receipt and storage of the token (steps 6a and 6b in the figure).

If the first additional SDTSP component 116 and the second additional SDTSP component 118 hear the custom event, they can then send a data request to the API 132 of the second server entity 130 (steps 6a and 6b in the figure). As described above in reference to FIG. 1, the data request can specify data that is stored at the second server entity 130 that a user of the browser application 110, particularly a user of either of the first additional SDTSP component 116 and the second additional SDTSP component 118 on the browser application 110, desires to view.

If the first additional SDTSP component 116 and the second additional SDTSP component 118 receive data in response the data requests sent to the second server entity 130, they can then render the data for viewing by a user, as described above in reference to FIG. 1.

The first server entity 120 can be maintained and built by the customer. As described above in reference to FIG. 1, the first server entity 120 can add an API key to a token request upon receiving a token request from the browser application 110 (step 2 in the figure) and can return the token and the time to live for the token generated by the API 132 to the browser application 110 (step 3 in the figure).

In the illustration shown in FIG. 2, the second server entity 130 includes a token generation endpoint 134 and data endpoints 136, in addition to the API 132. Each of the second server entity 130, the API 132, the token generation endpoint 134, and the data endpoints 136 is created and maintained by the SDTSP.

The token generation endpoint 134 can be included within the API 132. The token generation endpoint 134 authenticated the API key included in the appended token request sent by the first server entity 120 to the API 132 of the second server entity 130. The authentication of the API key by the token generation endpoint 134 can involve determining whether the API key is an API key to which the second server entity previously granted access. The authentication of the API key by the token generation endpoint 134 can additionally or alternatively involve determining whether the API key satisfies a specified condition or possesses a specified format.

Upon authenticating the API key included in the appended token request, the token generation endpoint 134 can generate a token and a time to live for the token, and return the token and the time to live for the token to the first server entity 120. The token and the time to live for the token are described in more detail above in reference to FIG. 1.

The data endpoints 136 store data. The data stored in the data endpoints 136 can be secure data that can only be viewed by third parties with authority to view such data. For example, the data stored in the data endpoints 136 can be proprietary financial data such as historical information or results of analyses of the financial instrument portfolio of third parties. As another example, the data stored in the data endpoints 136 can be personal medical information of patients of a medical institution.

The data endpoints 136 can receive data requests from components on the browser application 110. For example, the data endpoints 136 can receive data requests from the first additional SDTSP component 116 and the second additional SDTSP component 118 as described above. The data requests can be requests for the second server entity 130 to send data stored at the data endpoints 136 to the components on the browser application 110. The data requests can be accompanied by a token that was previously generated by the token generation endpoint 134.

If a given data request received by the data endpoints 136 is accompanied by a token that was previously generated by the token generation endpoint 134, the data endpoints 136 can authenticate the data request and respond to it by sending the requested data to the component of the browser application 110 that sent the data request.

Figure 3:
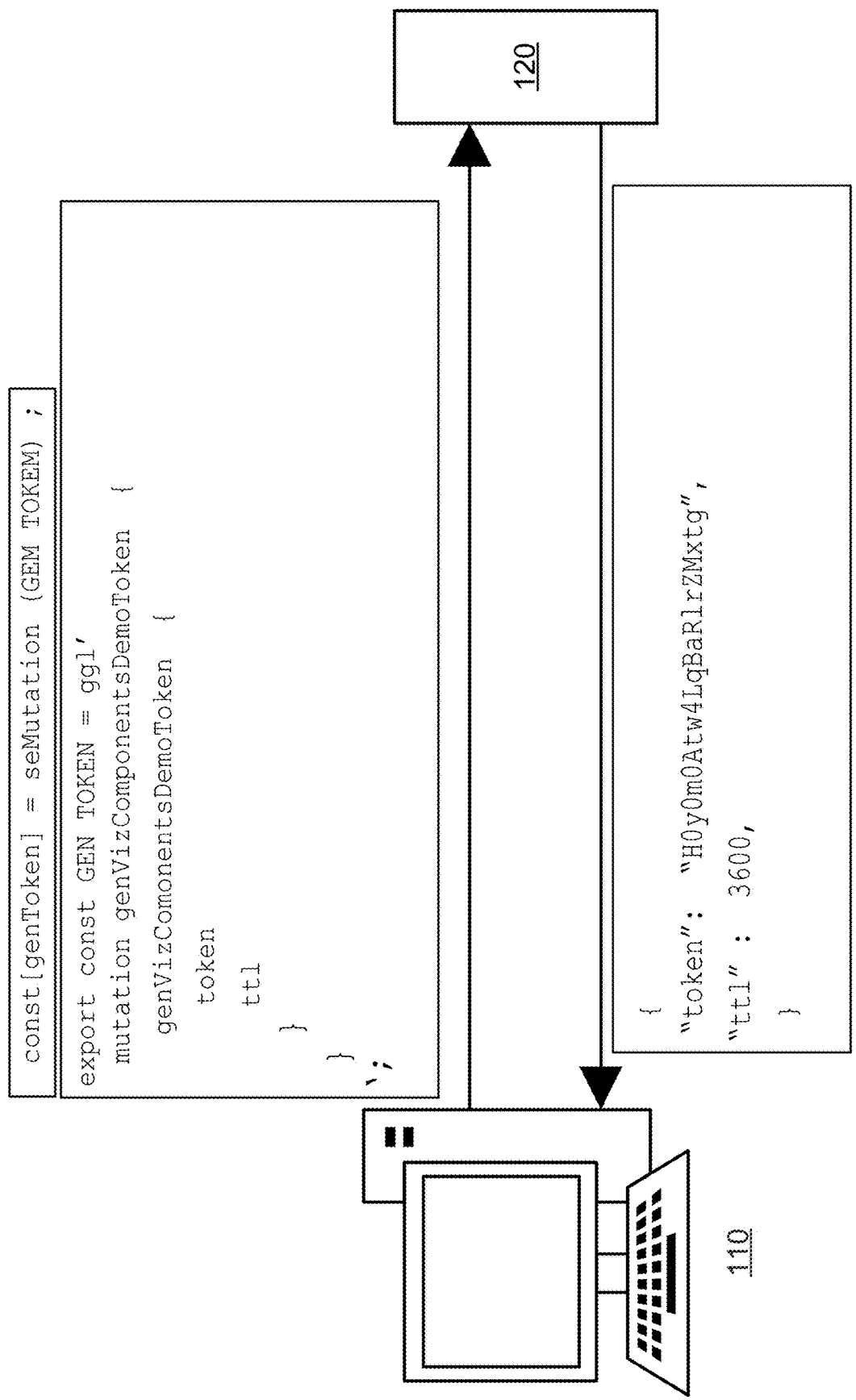
FIG. 3 is example code that is exchanged between a browser application and a first server entity during an authentication process that can be carried out by an authentication system.

FIG. 3 is example code that is exchanged between the browser application 110 and the first server entity 120 during the authentication process that can be carried out by an authentication system, such as the example authentication system 100, as described above. The top segment of code is passed from the browser application 110 to the first server entity 120. The code displayed in this segment is exemplary code for submitting the token request from the browser application 110 to the first server entity 120, as described in further detail above. The bottom segment of code is passed from the first server entity 120 to the browser application 110. The code displayed in this segment defines an exemplary token and a time to live for the exemplary token. The exemplary token is defined by a string of alphanumeric characters, and the time to live for the exemplary token is defined by a number representing a number of units of time. For example, the time to live for the exemplary token shown in FIG. 2 can represent 3600 seconds.

The exemplary token and the time to live for the exemplary token can have been previously received by the first server entity 120 from the second server entity 130. As described above, upon receipt of the exemplary token and the time to live for the exemplary token from the second server entity 130, the first server entity 120 can then return the exemplary token and the time to live for the exemplary token to the browser application 110. As described above, this exemplary token can then allow components of the browser application 110 to access data stored at the second server entity 130 prior to the expiration of the time to live for the exemplary token.

Figure 4:
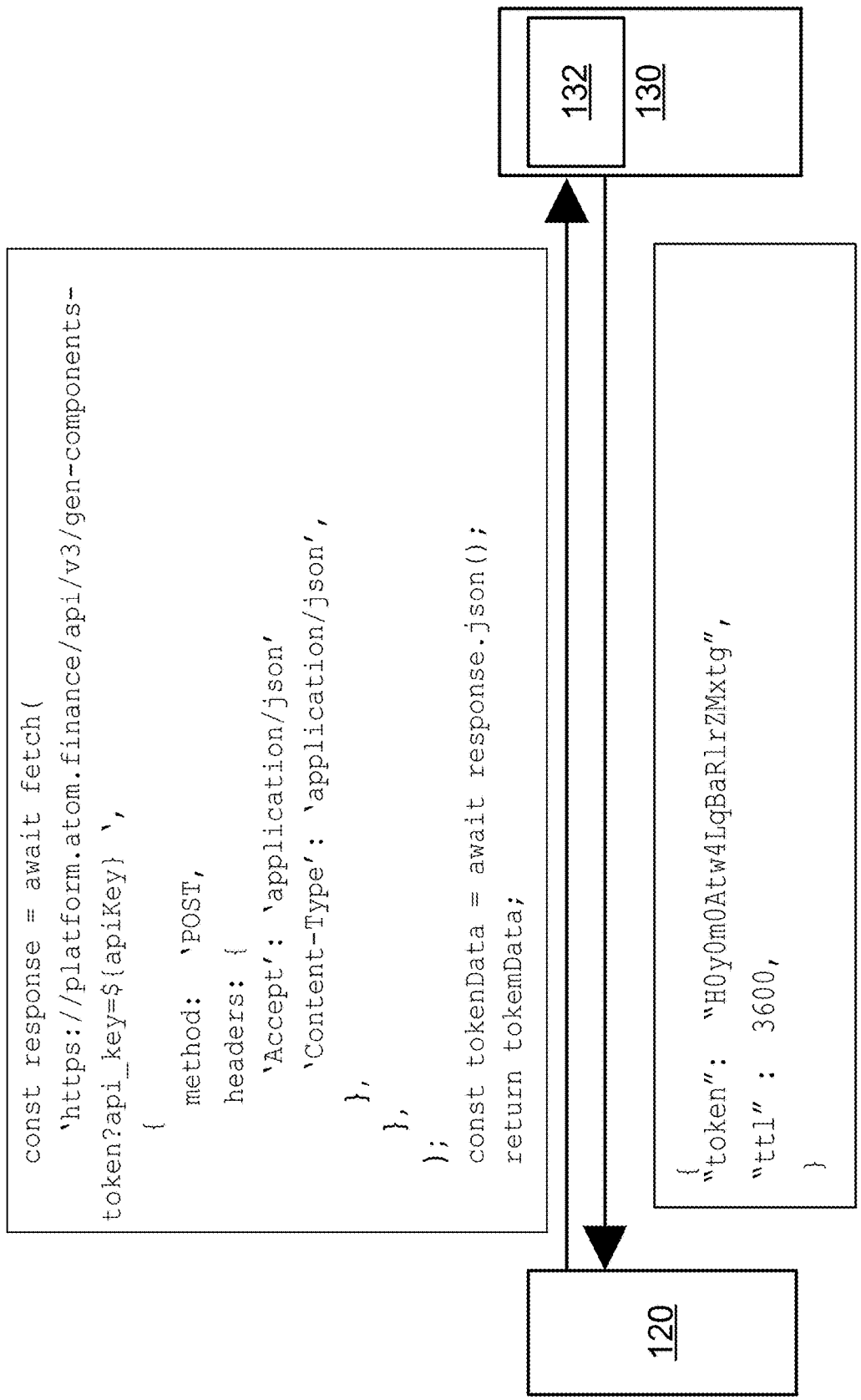
FIG. 4 is example code that is exchanged between a first server entity and an API of a second server entity during an authentication process that can be carried out by an authentication system.

FIG. 4 is example code that is exchanged between the first server entity 120 and the API 132 of the second server entity 130 during the authentication process that can be carried out by an authentication system, such as the example authentication system 100, as described above. The top segment of code is passed from the first server entity 120 to the API 132. The code displayed in this segment is exemplary code for forwarding the appended token request by the first server entity 120 to the API 132, as described in further detail above. The bottom segment of code is passed from the API 132 to the first server entity 120. The code displayed in this segment defines an exemplary token and a time to live for the exemplary token. This can be the same exemplary token and time to live that is subsequently forwarded by the first server entity 120 to the browser application 110, as described above in reference to FIG. 3.

Figure 5:
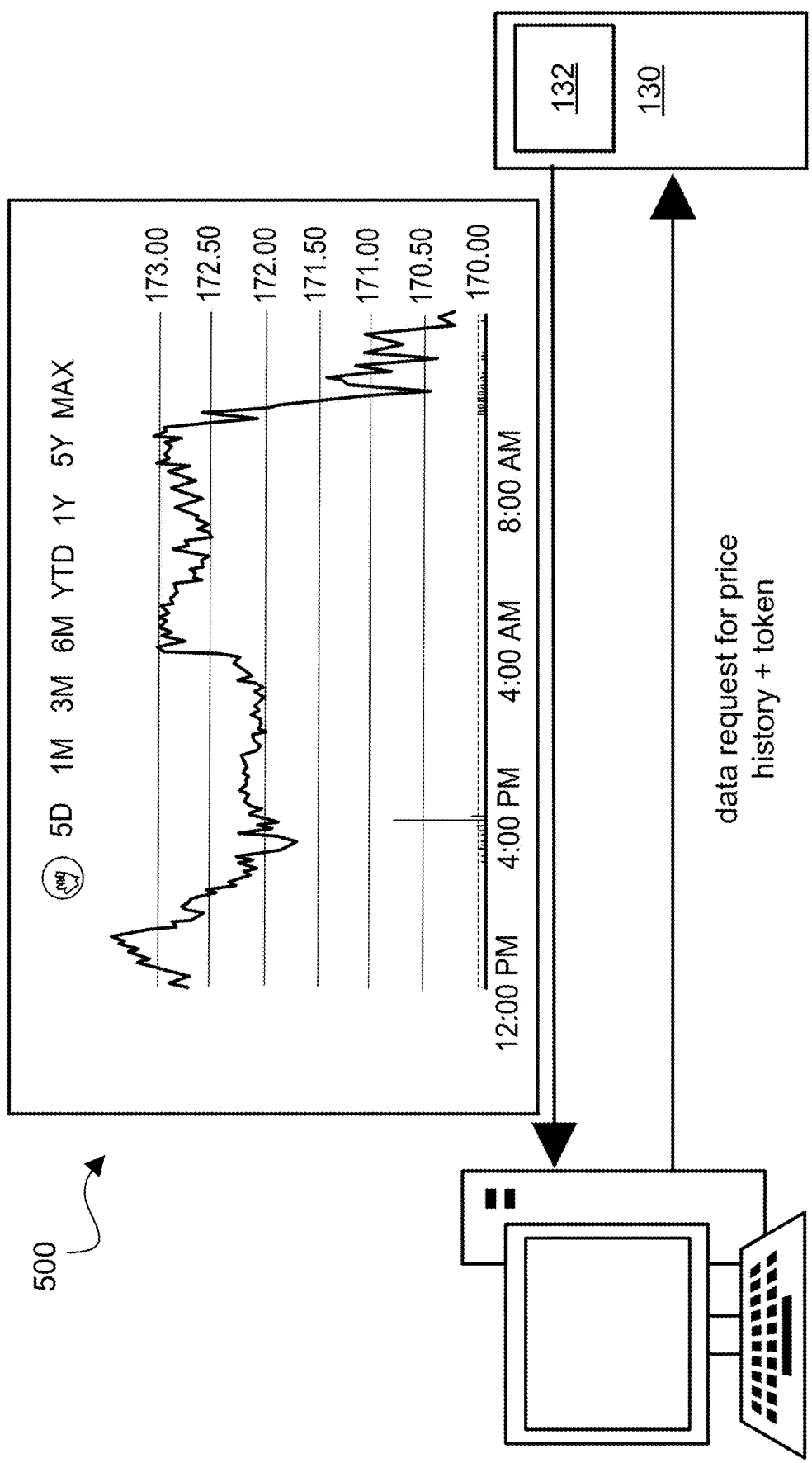
FIG. 5 is example data that is exchanged between a browser application and a second server entity during an authentication process that can be carried out by an authentication system.

FIG. 5 is example data that is exchanged between the browser application 110 and the second server entity 130 during the authentication process that can be carried out by an authentication system, such as the example authentication system 100, as described above. As shown in the figure and described in further detail above, the browser application 110 can send a data request accompanied by a token to the second server entity 130. The data request can specify data that is stored at the second server entity 130 that a user of the browser application 110 desires to view. For example, if the second server entity 130 stores financial data, the data request include a request for historical information about one or more financial instruments in which a user is interested. In the example illustrated in the figure, the data request includes a request for the price history of a particular financial instrument.

Upon determining that the data request from the browser application 110 is accompanied by a token and that the time to live for the token has not expired, the second server entity 130 can return the requested data to the browser application 110, as described in further detail above. In the example illustrated in the figure, the data can include historical price information about the particular financial instrument referenced in the data request.

Upon receiving the requested data from the second server entity 130, the browser application 110 can render the requested data to be viewed by a user of the browser application 110. The browser application 110 can render the requested data in any suitable format for representing the requested data for viewing by a user. In the example illustrated in the figure, the browser application 110 can render the requested price history data as the plot 500 shown in the top segment.

Figure 6:
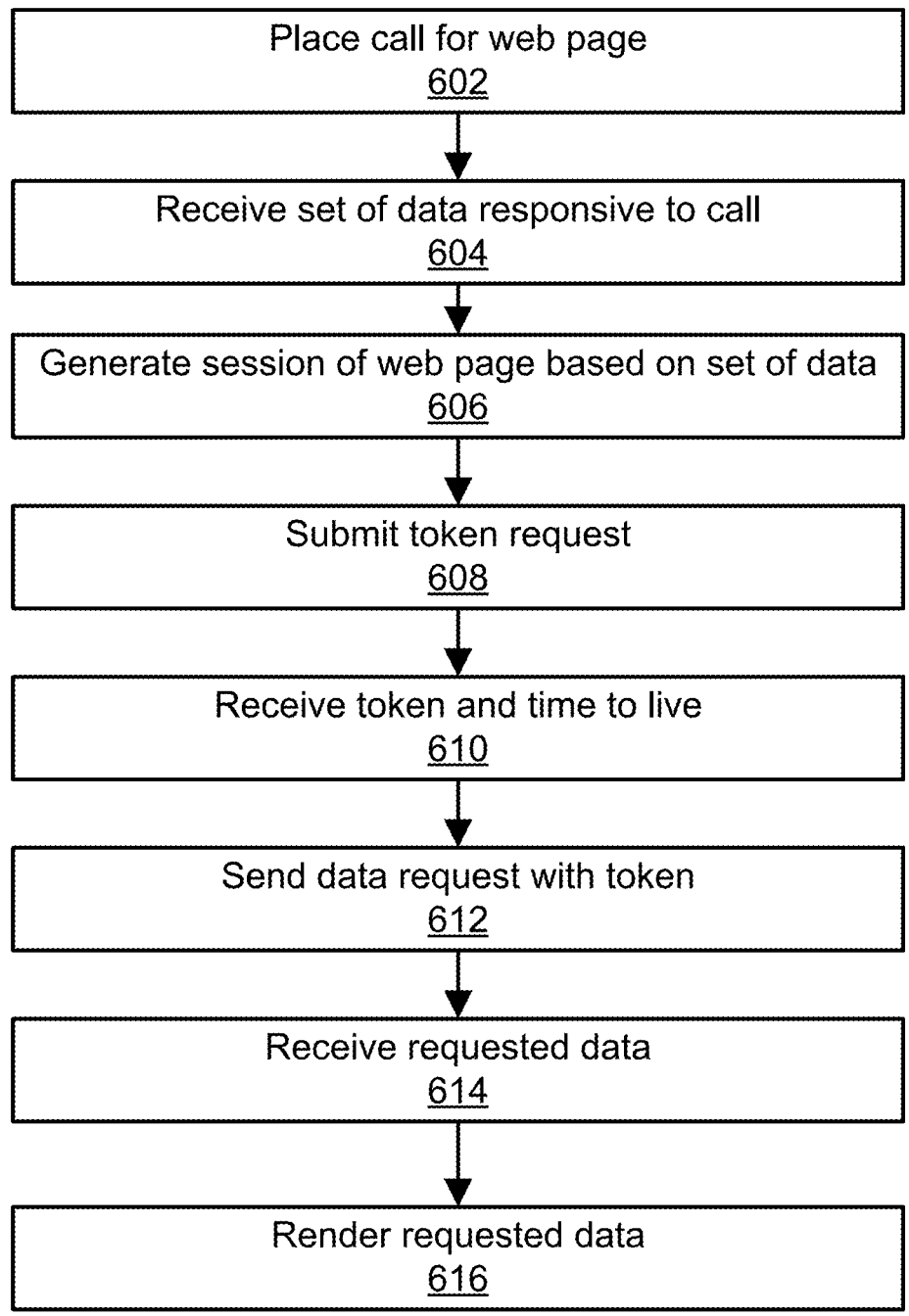
FIG. 6 is a flowchart of an example process performed by a browser application for authenticating a request for data.

FIG. 6 is a flowchart of an example process 600 performed by an entity submitting a request for data, e.g., data for a webpage. For convenience, the process 600 will be described as being performed by a system of one or more computers, located in one or more locations, and programmed appropriately in accordance with this specification. For example, a browser application, e.g., the browser application 110 of the system 100 of FIG. 1, appropriately programmed, can perform the process 600.

The browser application can be utilized by users to gain access to data stored at a server entity. The browser application can be accessed via a user device. In particular, users may utilize the browser application to download one or more web pages through which they can securely request data that is stored at a second server entity.

The browser application places a call for a web page to a first server entity (step 602). The first server entity can include one or more server(s) of an organization that provides access to proprietary information for its clients. For example, the first server entity can be the first server entity 120 of FIG. 1.

The browser application receives a set of data from the first server entity responsive to the call (step 604). The set of data returned by the first server entity can include data required to generate the web page called for by the browser application.

The browser application generates a session of the web page based on the set of data (step 606). The session of the webpage can include one or more components. The session of the web page can include a window object, in which a user of the browser application can enter commands. For example, the user can enter commands into the window object to start an authentication process, whereby a request for secure data from a component of the browser application to an external server entity storing the data can be authenticated. An example of a window object can be the window 112 of FIG. 2.

The session of the web page can include an authorization component that executes code to initiate the authentication process for authenticating a request for secure data from a component of the browser application to an external server entity storing the data. For example, the authorization component can request a token that is used to authenticate secure data requests, setting the token in the storage of the session of the web page if it is received, and emitting a custom event to other components included in the session of the web page that notifies the other components that the token has been received and set in storage. An example of an authorization component can be the SDTSP authorization component 114 of FIG. 2.

The session of the web page can include additional components that request data and render any data received for viewing by a user. The additional components can listen for custom events to be emitted by an authorization component. The additional components can send requests for secure data to an external server entity. In some implementations, the additional components can send requests for secure data to an external server entity upon hearing a custom event emitted by an authorization component. Examples of additional components can be the first additional SDTSP component 116 and the second additional SDTSP component 118 of FIG. 2.

The browser application submits a token request to the first server entity for a token from an application programming interface (API) hosted by a second server entity (step 608). The second server entity can represent a different entity than that which the first server entity represents. For example, the second server entity can be the server of an organization that provides data to third parties. The data can be secure or proprietary data. An example of a second server entity can be the second server entity 130 of FIG. 1. An example of an API hosted by a second server entity can be the API 132 hosted by the second server entity 130 of FIG. 1.

The token request can be a request for a token as a means for authenticating access by components of the web page of the browser application to data from the second server entity. An example format of a token request submitted by the browser application to the first server entity is shown in FIG. 3.

The browser application receives the token and a time to live for the token from the first server entity (step 610). The token can take any form, such as a string of alphanumeric characters or any other suitable form. The time to live for the token can indicate a time period during which the token is valid. The time to live for the token can take the form of a number representing a number of units of time. An example format of a token and a time to live for the token received by the browser application from the first server entity is shown in FIG. 3.

Prior to receiving the token and a time to live for the token by the browser application, the first server entity can have added an API key to the token request to produce an appended token request and forwarded the appended token request to the API at the second server entity. The API at the second server entity can then have authenticated the API key and returned the token and a time to live for the token to the first server entity. The first server entity can then have returned the token and the time to live for the token to the browser application.

Prior to expiration of the time to live for the token, the browser application sends a data request with the token to the second server entity (step 612). The data request can specify data that is stored at the second server entity that a user of the browser application desires to view.

The browser application receives requested data in response to the data request from the second server entity (step 614). Prior to the browser application receiving the requested data, the second server entity can have determined that a data request that it received from the browser application was accompanied by a token, and that the time to live for the token has not yet expired. The second server entity can have authenticated the data request that it received from the browser application.

The browser application renders the requested data (step 616). The browser application can render the requested data in a suitable format for viewing by a user of the browser application. An example format of the rendered requested data is shown in FIG. 5.

In some implementations, the browser application can iteratively perform steps 608-616 described above upon expiration of a time to live for each token received from the first server entity.

Figure 7:
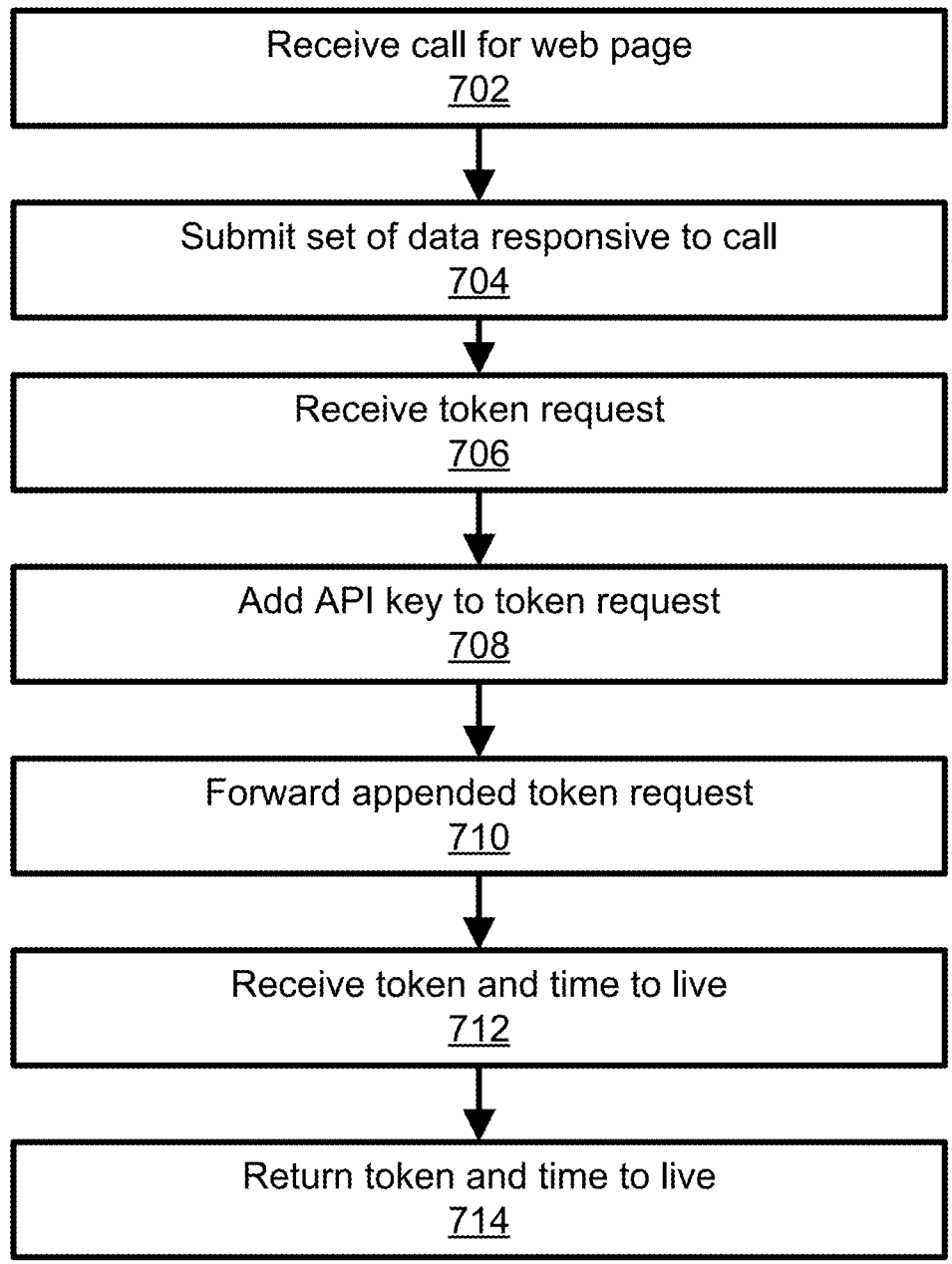
FIG. 7 is a flowchart of an example process performed by a first server entity for authenticating a request for data.

FIG. 7 is a flowchart of an example process 700 for authenticating a request for data performed by an entity that facilitates data request authentication services. For convenience, the process 700 will be described as being performed by a system of one or more computers, located in one or more locations, and programmed appropriately in accordance with this specification. For example, a first server entity included in an authentication system, e.g., the first server entity 120 of the example authentication system 100 of FIG. 1, appropriately programmed, can perform the process 700.

The first server entity receives a call for a web page from a browser application (step 702). The browser application can be utilized by users to gain access to data stored at a server entity. The browser application can be accessed via a user device. In particular, users may utilize the browser application to download one or more web pages from the first server entity through which they can authenticate requests for data that is stored at the server entity that stores the data.

The first server entity submits a set of data responsive to the call to the browser application (step 704). The set of data submitted to the browser application can include any data required to generate the web page called for by the browser application.

The first server entity receives from the browser application a token request for a token from an application programming interface (API) hosted by a second server entity (step 706). The second server entity can represent a different entity than that which the first server entity represents. For example, the second server entity can be the server of an organization that provides data to third parties. The data can be secure or proprietary data. An example of a second server entity can be the second server entity 130 of FIG. 1. An example of an API hosted by a second server entity can be the API 132 hosted by the second server entity 130 of FIG. 1.

The token request can be a request for a token as a means for authenticating access by components of the web page of the browser application to data from the second server entity. An example format of a token request submitted by the browser application to the first server entity is shown in FIG. 3.

Prior to the first server entity receiving the token request from the browser application, the browser application can have generated a session of the web page based on the set of data previously submitted to the browser application by the first server entity.

The first server entity adds an API key to the token request to produce an appended token request (step 708). An appended token request includes both a request for a token and an API key. An API key can take any form, such as a string of alphanumeric characters or any other suitable form. An API key is a means for authenticating a request for a token from the second server entity, as explained above in reference to FIG. 1.

As explained above, this step is advantageous because it eliminates the need for separately granting an API key by the second server entity to each browser application requesting a token, while still preserving the security of the data stored at the second server entity.

The first server entity forwards the appended token request to the API at the second server entity (step 710).

The first server entity receives from the second server entity a token and a time to live for the token (step 712). In particular, the first server entity can receive the token and the time to live for the token from the API hosted by the second server entity.

The token can take any form, such as a string of alphanumeric characters or any other suitable form. The time to live for the token can indicate a time period during which the token is valid. The time to live for the token can take the form of a number representing a number of units of time. An example format of a token and a time to live for the token received by the first server entity from the second server entity is shown in FIG. 4.

Prior to the first server entity receiving the token and the time to live for the token, the API at the second server entity can have authenticated the API key. The authentication of the API key by the API can involve determining whether the API key is an API key to which the second server entity previously granted access. The authentication of the API key by the API can additionally or alternatively involve determining whether the API key satisfies a specified condition or possesses a specified format.

Upon authenticating the API key, the API at the second server entity can have returned the token and the time to live for the token to the first server entity.

The first server entity returns the token and a time to live for the token to the browser application (step 714). Upon receiving the token and the time to live for the token from the first server entity, the browser application can submit data requests accompanied by the token to the second server entity. Since the data requests are accompanied by the token, the second server entity can authenticate the data requests and return to the browser application data responsive to the requests. The browser application can then render the returned data in a suitable form for viewing by a user, as described above.

In some implementations, the first server entity can receive token requests from the browser application iteratively upon expiration of the time to live for each token that is returned to the browser application. In such implementations, the first server entity can iteratively perform steps 706-714 of process 700.

Figure 8:
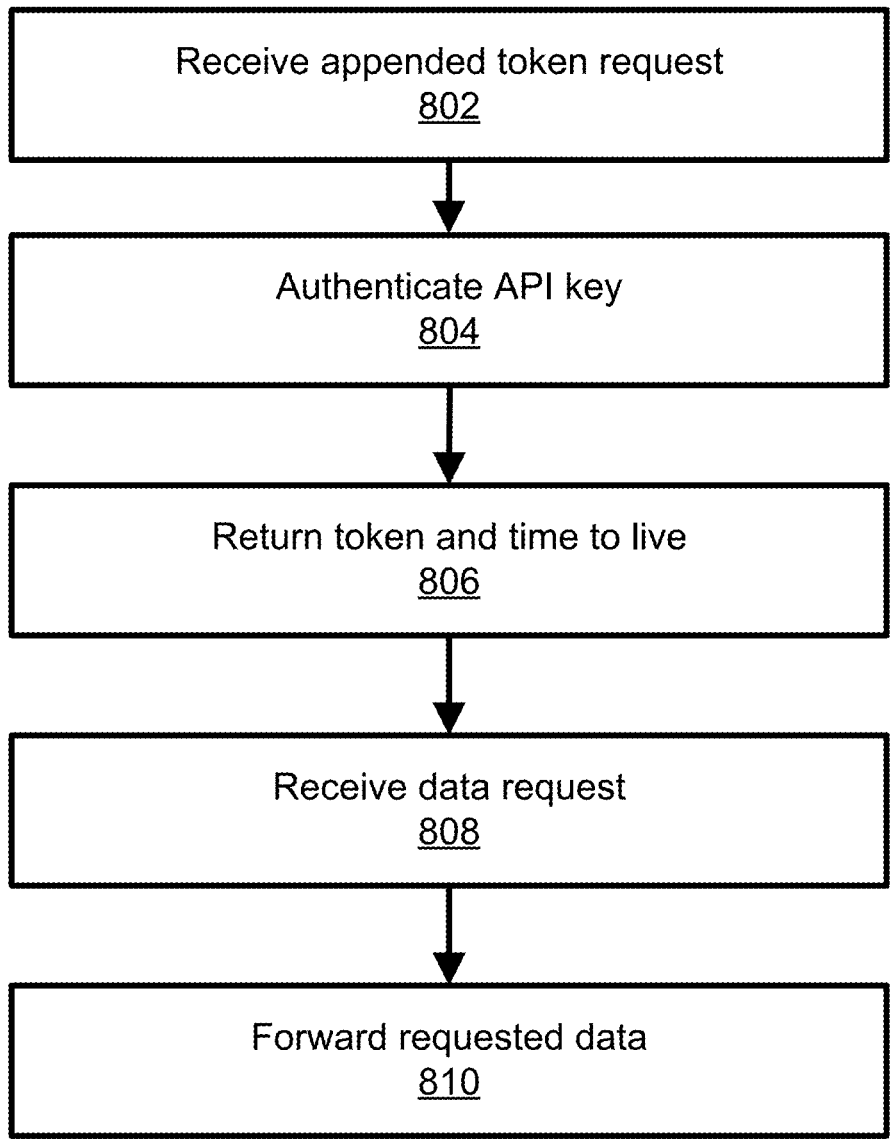
FIG. 8 is a flowchart of an example process performed by a second server entity for authenticating a request for data.

FIG. 8 is a flowchart of an example process 800 for authenticating a request for data, performed by an entity the stores the data. For convenience, the process 800 will be described as being performed by a system of one or more computers, located in one or more locations, and programmed appropriately in accordance with this specification. For example, a second server entity included in an authentication system, e.g., the second server entity 130 of the example authentication system 100 of FIG. 1, appropriately programmed, can perform the process 800.

The second server entity receives from a first server entity an appended token request (step 802). An appended token request includes both a request for a token and an API key. An API key can take any form, such as a string of alphanumeric characters or any other suitable form. An API key is a means for authenticating a request for a token from the second server entity, as explained above in reference to FIG. 1.

The first server entity can represent a different entity than that which the second server entity represents. The first server entity can be the server of an organization that provides access to proprietary information stored at the second server entity for its clients. For example, the first server entity can be the first server entity 120 of FIG. 1.

Prior to the second server entity receiving the appended token request from the first server entity, the first server entity can have received a call for a web page from a browser application and returned a set of data to the browser application responsive to the call. The browser application can be utilized by users to gain access to data stored at the second server entity. The browser application can be accessed via a user device. In particular, users may utilize the browser application to download one or more web pages from the first server entity through which they can authenticate requests for data that is stored at the second server entity.

Upon receiving the set of data from the first server entity responsive to the call for the web page and prior to the second server entity receiving the appended token request from the first server entity, the browser application can have generated a session of the web page based on the set of data and submitted to the first server entity a token request for a token from an application programming interface (API) hosted by the second server entity. The token request can be a request for a token as a means for authenticating access by components of the web page of the browser application to data from the second server entity. An example format of a token request submitted by the browser application to the first server entity is shown in FIG. 3.

Upon receiving the token request from the browser application and prior to the second server entity receiving the appended token request from the first server entity, the first server entity can have added an API key to the token request to form the appended token request and forwarded the appended token request to the second server entity.

The second server entity authenticates the API key (step 804). In particular, the API hosted by the second server entity can authenticate the API key. The authentication of the API key by the API can involve determining whether the API key is an API key to which the second server entity previously granted access. The authentication of the API key by the API can additionally or alternatively involve determining whether the API key satisfies a specified condition or possesses a specified format.

The second server entity returns the token and a time to live for the token to the first server entity (step 806). The token can take any form, such as a string of alphanumeric characters or any other suitable form. The time to live for the token can indicate a time period during which the token is valid. The time to live for the token can take the form of a number representing a number of units of time. An example format of a token and a time to live for the token returned by the second server entity to the first server entity is shown in FIG. 4.

Prior to the second server entity returning the token and the time to live for the token to the first server entity, the first server entity can have been configured to forward the token and the time to live for the token to the browser application.

Prior to expiration of the time to live for the token, the second server entity receives from the browser application a data request with the token (step 808). The data request can specify data that is stored at the second server entity that a user of the browser application desires to view.

The second server entity forwards to the browser application requested data in response to the data request (step 810). Prior to forwarding the requested data to the browser application, the second server entity can have determined that a data request that it received from the browser application was accompanied by a token, and that the time to live for the token has not yet expired. The second server entity can have authenticated the data request that it received from the browser application.

Upon receiving the requested data forwarded by the second server entity, the browser application can render the requested data. The browser application can render the requested data in a suitable format for viewing by a user of the browser application. An example format of the rendered requested data is shown in FIG. 5.

In some implementations, the second server entity can iteratively receive appended token requests from the first server entity, as the browser application iteratively sends token requests to the first server entity upon expiration of the time to live of each token received by the browser application. In such implementations, the second server entity can iteratively perform process 800.

In some implementations of the technologies disclosed herein, there may be a customer corresponding to a client. The customer can represent an owner of a first server entity, such as the first server entity 120 described herein, and the client can represent a user of a browser application, such as the browser application 110 described herein. The customer can be operating a computing terminal (e.g., a desktop computer, a laptop computer, a mobile phone, a tablet computer) running an operating system (OS) and an application (e.g., a web browser application) running on the OS. There can be a few steps to be performed required by the customer in order to enable the web component, as mentioned above, i.e., an authorization component such as the SDTSP authorization component 114, to do its job. These steps precede any action taken by the authorization component.

For example, the customer can be required to, first, install a web components library including the authorization component. The customer can next be required to add the authorization component to a parent page in which other components will render. The customer can next be required to use a scripting language, such as JavaScript, to set a callback function to a window object on the web page. The details of this callback function will depend on the structure of the customer's server but setting that function in the client can be accomplished, for example, with code such as the code displayed in FIG. 9.

This step enables the web component to have access to the callback function which will return the token for authentication. This function should take no arguments and return either a promise or an object containing two properties: a token string and a time to live number, as returned by the token generation endpoint of the second server entity. This function is up to the customer for custom implementation, as needed, although the function must be declared on the window of the page so the authorization component can call the function when needed.

Once all those steps are in place, the authorization component can operate as soon as the web page is rendered on the client, retrieving the token, setting the token in a session of the window, and refreshing the token, if required.

As mentioned above, the first server entity of the authentication systems and methods disclosed herein can be a customer of the organization associated with the second server entity where secure data is stored. The user of the browser application can be a client of the customer. The authorization component can also be referred to as the authentication component.

For customer simplicity, the authentication process disclosed herein can be written in a custom HTML web component that the customer installs via a library into a client-side code base, and then inserting the authentication component in a template for the webpage alongside other HTML elements (e.g., a content divisional element, a header, an anchor element). For example, the template sets a structure of a tree for a document object model (DOM) for the webpage to enable the browser application to render the webpage. In order to facilitate the authentication processes described herein, the customer can include the authorization component in their client-side templating (e.g., either directly in HTML files, JavaScript syntax extension (JSX), or any framework equivalent for HTML code), and follows the steps for integration, as mentioned above, including setting a callback function to the window object.

When the page loads, the authorization component runs the callback (set by the customer) to obtain a token. The API hosted by the second server entity can be a representational state transfer (REST) API, which can be arranged in terms of endpoints. However, this configuration is not required, and the API can be of another type. For example, the API can have or enable a query runtime engine (e.g., a task dedicated software logic that can be started, stopped, or paused) running on the server, where the query runtime engine enables declarative data fetching, where a client can specify exactly what data is need from the API, i.e., a single endpoint (e.g., via HTTP) and responds with precisely the data a client asked for. Such API can be organized in terms of a schema. One example of such API is GraphQL query language. For example, the GraphQL query language can differ from the REST API in a manner in which data is sent to the client, i.e., in a REST architecture, the client makes an HTTP request and data is sent as an HTTP response, whereas in a GraphQL architecture, the client requests data with queries. Regardless of the API used, this token has an expiration time of 3600 seconds, although other preset time periods are possible (e.g., second, seconds, minute, minutes, hour, hours, day, days, week, weeks, month, months, year, years).

Example code that the authorization component can use to run the callback can be the following:
  await window [atomCustomFunctionsObj][customFn-Names.atomAuth]( );

The authorization component can then set a token in session storage. An example implementation of the token set in session storage can be:
  sessionStorage.setItem('atom-token', token);

Since the token includes a time to live, a timeout is set inside the authorization component so that if the token expires, the web component will call for another token.

If this process is successful, then the authorization component emits a custom event to let the other components on the web page know that there is a token available. An example implementation of the custom event emitted by the authorization component can be:
  const tokenAvailable=new CustomEvent ("tokenAvailable");
  document.dispatchEvent(tokenAvailable);

If the timeout (ttl) is reached, the authorization component once again invokes the callback, and the process starts over to refresh the token.

One can leverage the stencil.js (or another suitable) framework to build and package web components to build and package web components. The exact same functionality can be executed in another framework or in standard HTML language without using a framework. The stencil framework includes a component API, which exposes a set of functions and methods called "decorators" to ease the development experience. For example, the framework allows the developer to control the lifecycle of a component, so that if some saved data (referred to as "state" in most frameworks) or inputs (referred to as "props") changes value, the component should re-render within the browser application. Without a framework, that re-render would have to be intentionally triggered, which is laborious and time-consuming. In this case, we leverage the componentDidLoad ( ) method to get and set the token (outlined above), which could be replaced with a method called in the constructor of a simple HTML web component.

The component and its subsequent authentication steps are included in the diagram displayed in FIG. 2, described above. This flow is run on render of the client page, assuming that the customer steps, when needed, as mentioned above, have been followed correctly.

The technologies may employ Web Components (e.g., the encapsulation of the authentication code, importable into a client side), Fetch API (e.g., the method of retrieving the expiry token from the Atom server), Session storage (e.g., the session specific environment to store the token for each component to use, Custom Events (e.g., a custom event is fired to the DOM so other components know (e.g., listen and hear) that the page has been authenticated and that the data can be fetched, or Stencil.js (e.g., the framework used to create the web component, although this framework is not required and any suitable component framework could also be used for this purpose, or building the web component with pure HTML).

In some implementations, the customer would implement the frontend code in order to call the backend for a token and place the token themselves. Since the description above covers the delivery of this token process as a packaged web component, the customer may implement the same functionality themselves or find another distribution process of doing this authentication on behalf of the customer.

In some implementations, there is a public API key that can be exposed on the client side. In order to maintain the ease for the customer, and not require them to build out an authentication process, there may be avoidance of the authentication process by creating a public key that the customer could expose without risk of the public key being compromised. This would likely require additional security checks, such as domain checking.

In some implementations, a script solution could work in a similar way to the web authentication component. This script would likely expose the API key on the browser, unless the script also calls a custom callback set in the client, as described above. However, the script approach may introduce additional complexities in making sure the script is run after custom callbacks have been added to the window, which could be challenging in some situations.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A browser application implemented method comprising:
    placing a call for a web page from the browser application to a first server entity;
    receiving, at the browser application, a set of data from the first server entity responsive to the call;
    generating, at the browser application, a session of the web page based on the set of data, wherein the session of the web page includes an authorization component;
    submitting a token request, by the browser application, to the first server entity for a token from an application programming interface (API) hosted by a second server entity;
    receiving, at the browser application, the token and a time to live for the token from the first server entity, the first server entity having added an API key to the token request to produce an appended token request and forwarded the appended token request to the API at the second server entity, the API at the second server entity having authenticated the API key and returned the token and a time to live for the token to the first server entity, and the first server entity having returned the token and the time to live for the token to the browser application;
    emitting, by the authorization component, a custom event that communicates to components of the web page that the token has been received and set in a storage of the session;
    prior to expiration of the time to live for the token, sending, by the browser application to the second server entity, a data request with the token;
    receiving, at the browser application from the second server entity, requested data in response to the data request; and
    rendering, at the browser application, the requested data.

2. The method of claim 1, wherein the session of the web page includes a window object.

3. The method of claim 2, comprising initiating, by the window object, a storage of the token unique to the session such that components of the web page can access the token during the session.

4. The method of claim 2, wherein the window object is built and maintained by an entity represented by the first server entity and the authorization component is built and maintained by a second entity represented by the second server entity.

5. The method of claim 1, wherein the authorization component is a custom hypertext markup language (HTML) element.

6. The method of claim 1, wherein the second server entity represents a different entity than the first server entity represents.

7. The method of claim 1, comprising submitting a second token request, by the browser application, to the first server entity for a second token from the API upon expiration of the time to live for the token.

8. The method of claim 1, wherein the token is limited in scope.

9. The method of claim 1, wherein the time to live for the token is a duration of time for which the token is accessible to components of the web page for use in authenticating data requests.

10. A computer implemented method comprising:
receiving, by a first server entity, a call for a web page from a browser application;
submitting, by the first server entity to the browser application, a set of data responsive to the call;
receiving, by the first server entity from the browser application, a token request for a token from an application programming interface (API) hosted by a second server entity, the browser application having generated a session of the web page based on the set of data, wherein the session of the web page includes an authorization component;
adding, by the first server entity, an API key to the token request to produce an appended token request;
forwarding, by the first server entity, the appended token request to the API at the second server entity;
receiving, at the first server entity from the second server entity, a token and a time to live for the token, the API at the second server entity having authenticated the API key and returned the token and the time to live for the token to the first server entity; and
returning, by the first server entity, the token and a time to live for the token to the browser application, upon which the authorization component emits a custom event that communicates to components of the web page that the token has been received and set in a storage of the session.

11. The method of claim 10, wherein the session of the web page includes a window object.

12. The method of claim 10, wherein the second server entity represents a different entity than the first server entity represents.

13. The method of claim 10, wherein the token is limited in scope.

14. The method of claim 10, wherein the time to live for the token is a duration of time for which the token is accessible to components of the web page for use in authenticating data requests.

15. A browser application implemented method comprising:
receiving, by a second server entity from a first server entity, an appended token request, the first server entity having received a call for a web page from the browser application and returned a set of data to the browser application responsive to the call, the browser application having generated a session of the web page based on the set of data, wherein the session of the web page includes an authorization component, and submitted to the first server entity a token request for a token from an application programming interface (API) hosted by the second server entity, and the first server entity having added an API key to the token request to form the appended token request and forwarded the appended token request to the second server entity;
authenticating, by the API at the second server entity, the API key;
returning, by the API at the second server entity, the token and a time to live for the token to the first server entity, the first server entity having been configured to forward the token and the time to live for the token to the browser application, upon which the authorization component emits a custom event that communicates to components of the web page that the token has been received and set in a storage of the session;
prior to expiration of the time to live for the token, receiving, by the second server entity from the browser application, a data request with the token; and
forwarding, to the browser application by the second server entity, requested data in response to the data request, upon which the browser application renders the requested data.

16. The method of claim 15, wherein the second server entity represents a different entity than the first server entity represents.

17. The method of claim 15, wherein the token is limited in scope.

18. The method of claim 15, wherein the time to live for the token is a duration of time for which the token is accessible to components of the web page for use in authenticating data requests.

19. A system comprising:
one or more computers and one or more storage devices on which are stored instructions that are operable, when executed by the one or more computers, to cause the one or more computers to perform operations comprising:
receiving, by a second server entity from a first server entity, an appended token request, the first server entity having received a call for a web page from the browser application and returned a set of data to the browser application responsive to the call, the browser application having generated a session of the web page based on the set of data, wherein the session of the web page includes an authorization component, and submitted to the first server entity a token request for a token from an application programming interface (API) hosted by the second server entity, and the first server entity having added an API key to the token request to form the appended token request and forwarded the appended token request to the second server entity;
authenticating, by the API at the second server entity, the API key;
returning, by the API at the second server entity, the token and a time to live for the token to the first server entity, the first server entity having been configured to forward the token and the time to live for the token to the browser application, upon which the authorization component emits a custom event that communicates to components of the web page that the token has been received and set in a storage of the session;
prior to expiration of the time to live for the token, receiving, by the second server entity from the browser application, a data request with the token; and
forwarding, to the browser application by the second server entity, requested data in response to the data request, upon which the browser application renders the requested data.

* * * * *